Figure 1:
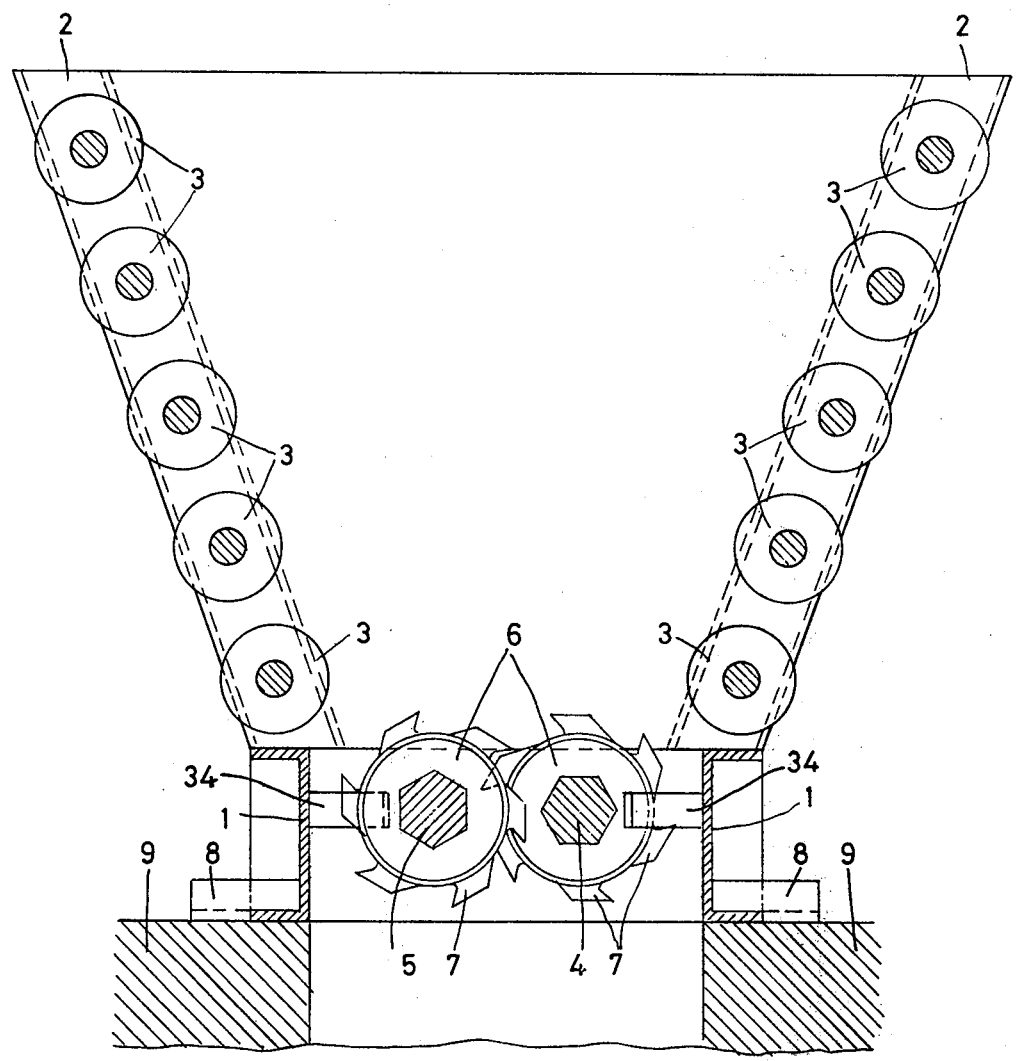

United States Patent [19]
Baikoff

[11] 3,991,944
[45] Nov. 16, 1976

[54] COMMINUTING APPARATUS

[76] Inventor: Eugene M. A. Baikoff, The Courtyard, 1605 Chexbres (Vaud), Switzerland

[22] Filed: Apr. 23, 1975

[21] Appl. No.: 570,574

[30] Foreign Application Priority Data
July 5, 1974 Switzerland............. 9297/74

[52] U.S. Cl. ................... 241/36; 83/582; 83/698; 241/191; 241/224; 241/236; 241/243
[51] Int. Cl.² ............... B02C 18/18; B02C 18/24
[58] Field of Search ............ 241/36, 190, 191, 222, 241/224, 236, 243; 83/582, 698

[56] References Cited
UNITED STATES PATENTS

| | | | |
|---|---|---|---|
| 2,986,347 | 5/1961 | Stevenson | 241/191 |
| 3,396,914 | 8/1968 | Liebman | 241/243 X |
| 3,664,592 | 5/1972 | Schweigert et al. | 241/236 UX |
| 3,845,907 | 11/1974 | Schwarz | 241/224 X |
| 3,868,062 | 2/1975 | Cunningham et al. | 241/236 X |
| 3,880,361 | 4/1975 | Schwarz | 241/191 X |

Primary Examiner—Roy Lake
Assistant Examiner—Howard N. Goldberg
Attorney, Agent, or Firm—LeBlanc & Shur

[57] ABSTRACT

An apparatus for comminuting bulky objects, especially vehicle tires and parts of automobile bodies, comprises two parallel shafts arranged for rotation in opposite directions and at different speeds, each shaft being driven by a separate hydraulic motor and provided with comminuting rings alternately axially staggered with respect to one another on each of the shafts. The rings are provided with means including sharp, pointed portions for seizing and comminuting the objects while conveying them through interstices defined between adjacent rings on the shafts and by smooth portions of the shafts themselves. The shafts comprise a number of alternately disposed grooved bearing surfaces and smooth surfaces constituting the smooth portions. The rings are formed of a number of ring-elements, each in the shape of a sector of an annulus and having a grooved, concave, cylindrical inner surface engaged with a portion of a grooved bearing surface. The ring-elements of each ring are interconnected by high-strength screws. The ring construction enables the rings to be very firmly secured to the shaft which bears them and at the same time enables the rings-elements to be changed without difficulty.

15 Claims, 9 Drawing Figures

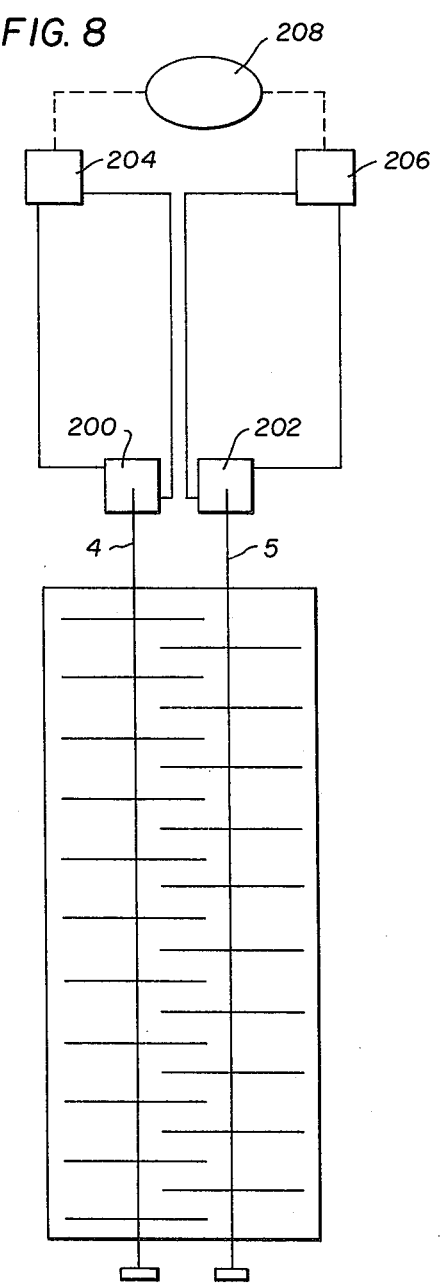

COMMINUTING APPARATUS

This invention relates to an apparatus for comminuting bulky objects, especially vehicle tires, other tough and rubbery materials, and parts of automobile bodies, comprising two parallel shafts having a predetermined distance between them, means for rotating the shafts in opposite directions, and comminuting rings having peripheries of predetermined dimensions, the rings being borne and rotated by the shafts and being alternately axially staggered with respect to one another on each of the shafts, the predetermined distance and the predetermined dimensions being such that the peripheries of the rings borne by one of the shafts, when viewed in axial projection, overlap the peripheries of the rings borne by the other of the shafts, a plurality of interstices being formed between portions of the rings and of the shafts, the rings being provided with means including sharp, pointed portions for seizing and comminuting the objects while conveying them through the interstices.

Apparatus of this kind have already been proposed, the difference being, however, that they are designed to comminute only waste material which is not very resistant, i.e., material which is hard but relatively frangible, such as glass, or soft but not highly resistant to tearing, such as cardboard or the like. Moreover, the known apparatus are intended to comminute some larger objects, but not very bulky ones such as whole parts of automobile bodies.

When it is desired to use apparatus of that kind to cut vehicle tires, for instance, into small pieces, significant difficulties are encountered owing to the fact that tires are neither hard and breakable nor easily torn. When a tire, or part of a tire, it situated between the cutters of such an apparatus, its very qualities of high-strength and toughness which yield good performance on the road represent a serious drawback; for instead of tearing, the tire is stretched and compressed and finally turns into a sort of doughy substance which can be drawn out without breaking and which becomes crammed in between the gripping means and the parts intended to supply a reaction to the action of the gripping means.

Furthermore, in order to comminute really large objects, it is obviously necessary to use a large-size apparatus. However, it is not feasible simply to build a larger version of one of the existing apparatus for comminuting medium-size objects, for there the cutting discs are made in one piece of high-strength steel. Significant difficulties are involved in manufacturing large, one-piece cutting discs with the required precision, especially since high-strength steel is not very easy to work. The use of a material which is easier to work might be considered, but in that case the effectiveness of the apparatus would suffer, and above all, the discs would wear out very quickly.

Moreover, it may happen that the material to be comminuted contains particularly hard, tough particles which tend to block the cutting members. Considering the great amount of force utilized in large-size machines, if special measures were not adopted such incidents would be liable to result in damage to the cutting members or to cause undue mechanical strain. The consequences would be particularly serious in the event of greatly increasing torque during such a blocked condition, as occurs with electric motors, for example.

Finally, in order to obtain varying degrees of coarseness of the scrap from different materials, it is desirable to have cutting members of differing shapes and arrangements and to be able to interchange them easily. Even for unvarying operaion, such elements ought to be easily replaceable, for they naturally wear out in time. The combination of this requirement with that of having a very sturdy and robust mechanical arrangement, above all for a large-size machine which must be capable of comminuting tough, bulky objects, poses serious structural and design problems to which there has not been any really satisfactory solution until now.

It is therefore a main object of this invention to provide a comminuting apparatus which satisfactorily solves the aforementioned problems and eliminates, or in any case very greatly reduces, the drawbacks described.

To this end, in the comminuting apparatus according to the present invention, the shafts comprise a number of alternately disposed grooved bearing surfaces and smooth bearing surfaces, the rings comprise a number of elements, each in the shape of a sector of an annulus and having a grooved, concave, cylindrical inner surface engaged with a portion of one of the grooved bearing surfaces, the aforementioned elements of each ring being interconnected by high-strength tangential connecting means, and each such element having on the outside a sharp, pointed portion forming a cutter-nose for seizing and comminuting the objects to be comminuted, the shape of the cutter-noses being adapted to those objects and to a desired coarseness of comminuted material.

Not only are the seizing and comminuting members then particularly firmly mounted on the shafts, but they are also very easy to assemble and dismantle, thus providing great flexibility of adaption allowing optimum comminution, according to the varying degrees of coarseness desired, of objects made of different materials.

In a preferred embodiment of the invention, the apparatus may comprise means making it possible for any number of the rings to move axially against a resilient return force in order to allow the escape of pieces of waste material which are too hard or too clogging, and which would otherwise tend to cause overly great mechanical stresses or blocking of the shafts.

In still another embodiment, the means for driving the shafts are hydraulic motors. The mechanical strain in the event of blocking is then only slightly greater than that produced during normal operation, and the sturdiness of the apparatus with respect to conditions of accidental blocking is thus improved.

Means for detecting a blocking of the shafts and for initiating a process to eliminate the cause of it may then be advantageously provided in cooperation with the hydraulic motors.

Figure 2:
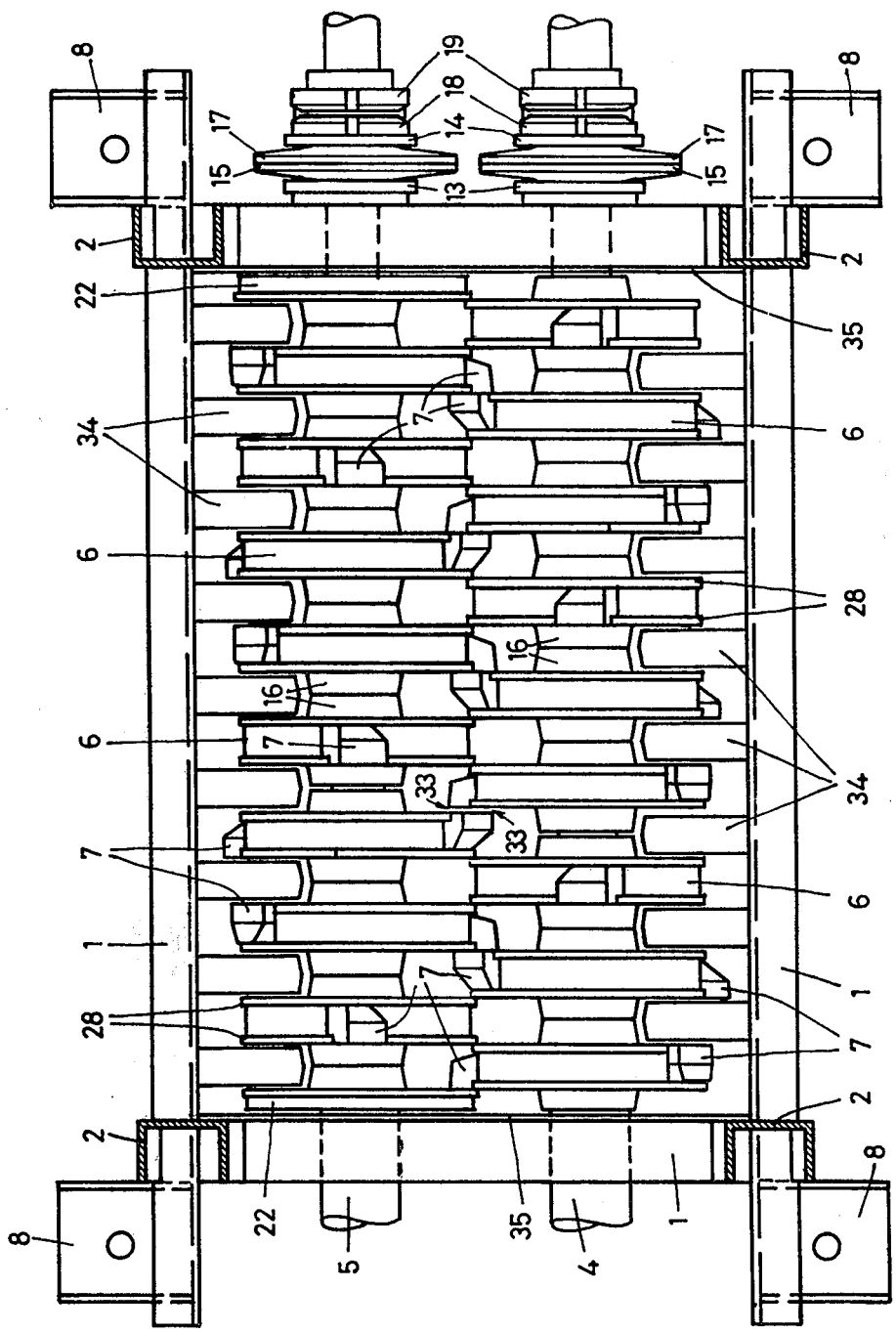
Figure 3:
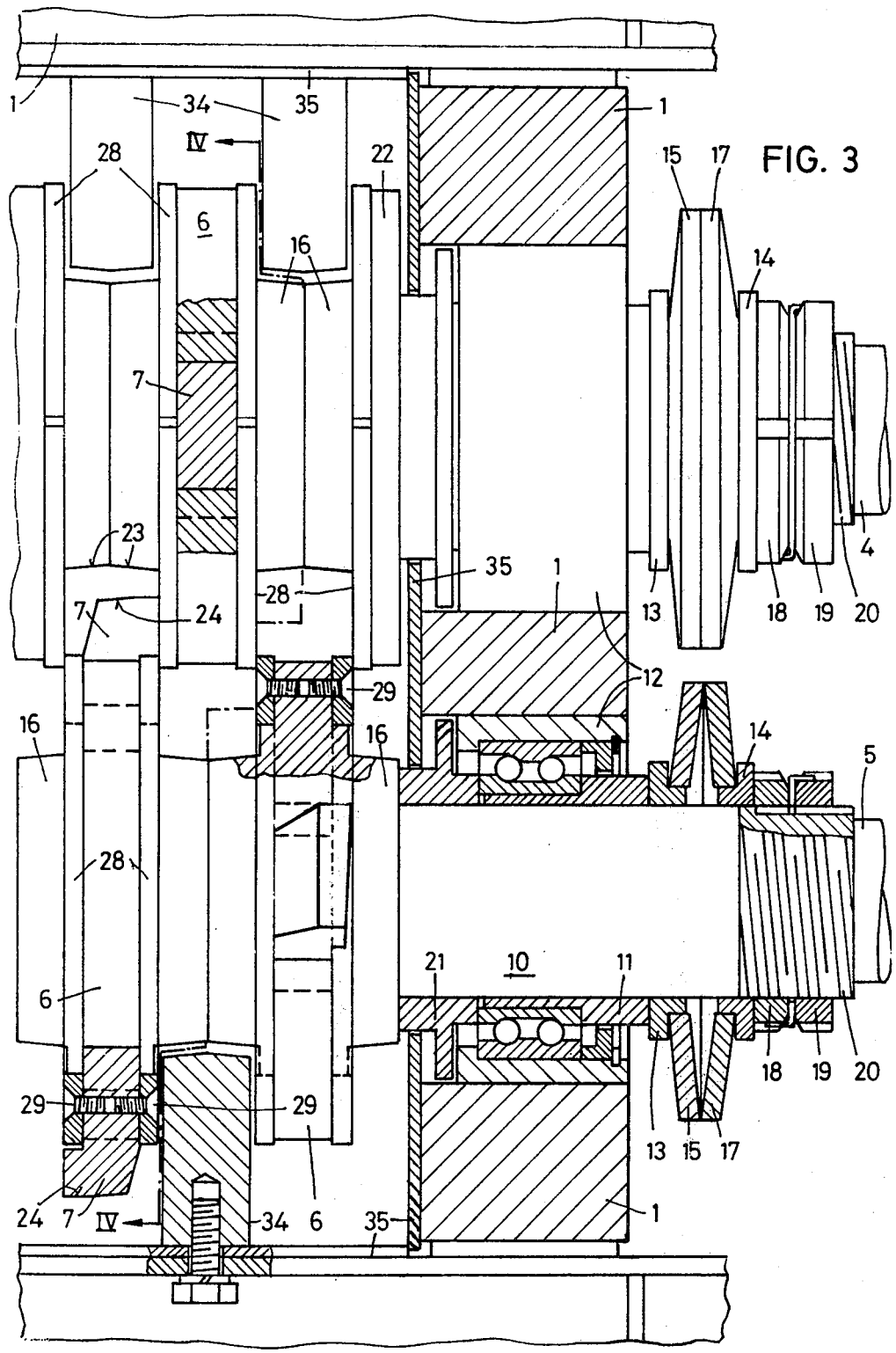
Figure 4:
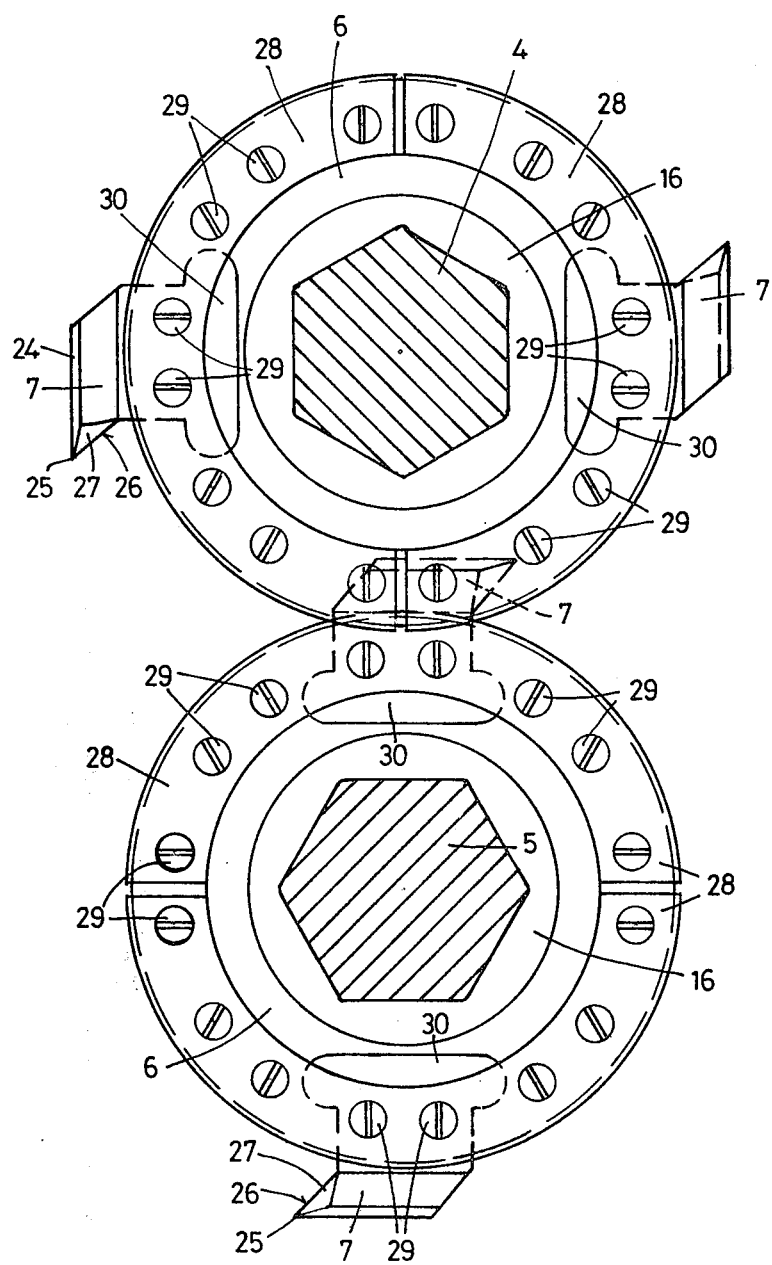
Figure 5:
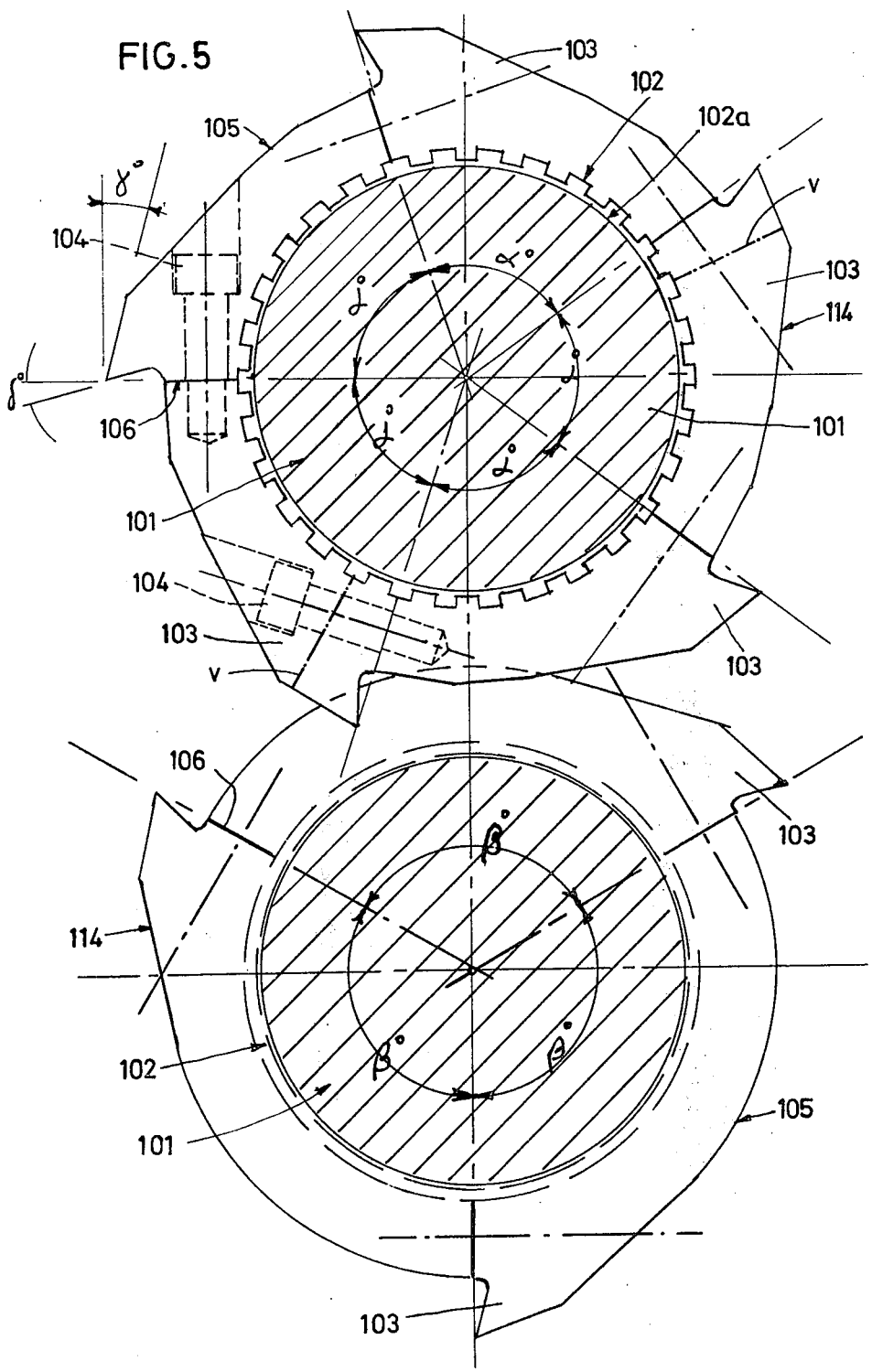
Figure 6:
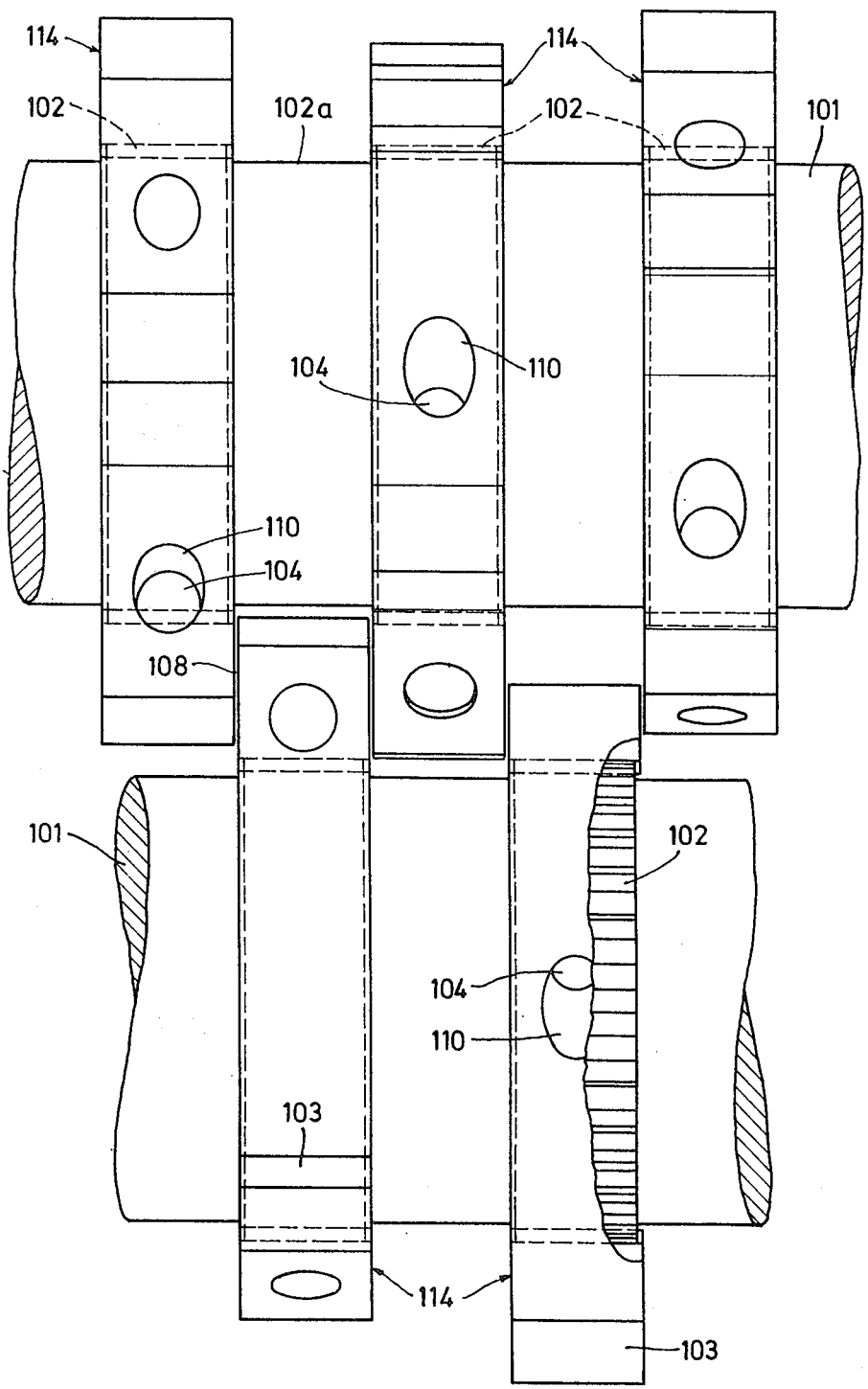
Figure 7A:
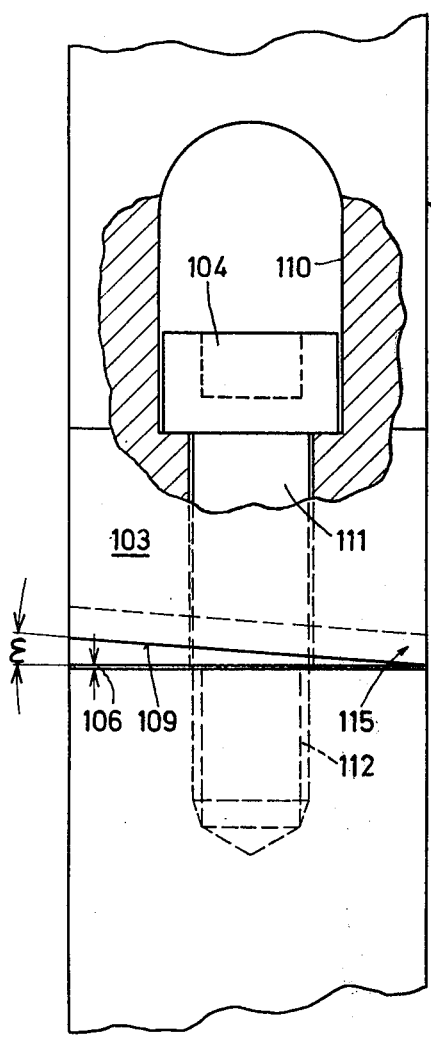
Figure 7B:
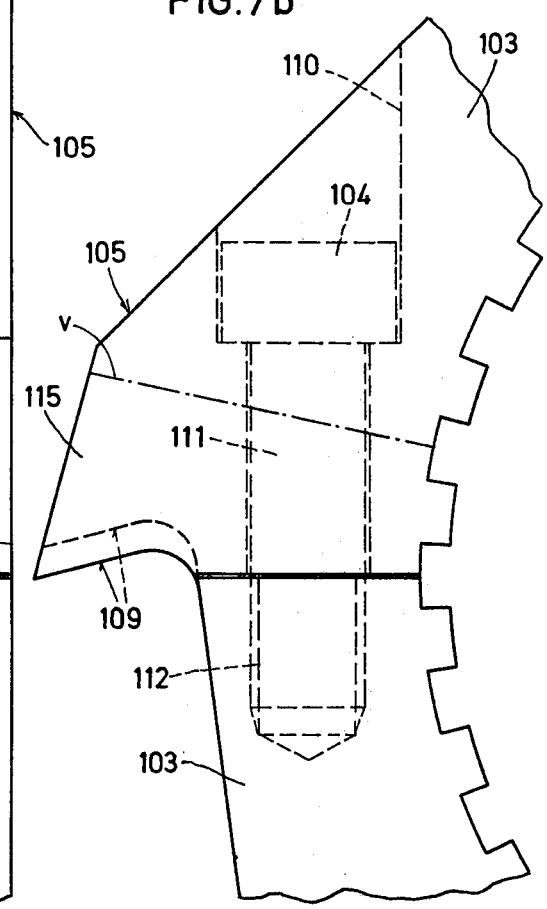

Other objects and advantages of the invention will become apparent from the following detailed description of preferred embodiments thereof, taken in conjunction with the accompanying drawings, in which:

FIG. 1 is a sectional elevation showing the general shape of a comminuting apparatus, FIG. 2 is a plan view of an embodiment of an apparatus of the type shown in FIG. 1 with the upper receiving and guiding arrangement removed, FIG. 3 is a plan view on a larger scale of part of the apparatus shown in FIG. 2, FIG. 4 is a section taken on the line IV—IV of FIG. 3, showing in detail the fitting of flat rings, or comminutors, on shafts and the fitting of cutters on these comminuting rings, FIG. 5 is a sectional view similar to FIG. 4 but relating to another, improved embodiment in which two shafts and two composite rings cooperate in the comminution, one of the rings comprising five elements and the other comprising three elements to illustrate a variation, FIG. 6 is a partial top view, similar in part to FIG. 3 but relating to the embodiment of FIG. 5 and illustrating the alternate arrangement of the composite rings on the shafts, as well as the fixing of the rings, by means of grooves, on grooved bearing surfaces of the shafts, between which smooth bearing surfaces remain, and FIGS. 7a and 7b show, on a larger scale, a composite-ring element with a cutter-nose for the embodiment according to FIGS. 5 and 6, with FIG. 7a illustrating this element as viewed from above and FIG. 7a illustrating it in profile.

FIG. 8 shows a schematic representatin of the device of this invention including the drive means and detector means.

In FIGS. 1 and 2, the comminuting apparatus may be seen to comprise a frame 1 made up of sectional iron and forming a rectangle, the long sides of which extend beyond the short sides, feet b serving to secure the frame 1 to a base 9 having an opening through which scraps of comminuted material may fall. Mounted on the frame 1, preferably by welding, is a receiving and guiding arrangement for the objects to be comminuted; this arrangement takes the general shape of a large hopper of rectangular cross-section, the two lateral faces of which are composed of rollers 3 disposed similarly to those of a conveyor raised up at a slant. The rollers 3 are mounted for rotation about their axes between pairs of uprights 2. Each of the end faces of this loading arrangement (which does not appear in FIG. 2) is formed by a trapezoidal sheet of iron.

Two parallel shafts 4 and 5 are rotatingly mounted within the frame 1, passing through its transverse end portions. The shafts 4 and 5 are mounted by means of ball bearings, as will be seen further on in connection with FIG. 3. They are arranged to be rotated in opposite directions by driving means which would be situated to the left of what is shown in FIG. 2. The cross-section of the segments of the shafts 4 and 5 situated within the frame 1 is hexagonal, as may be seen in FIG. 1. Flat comminutor rings 6, having a hexagonal center opening corresponding to the hexagonal cross-section of the shafts 4 and 5, are mounted on those shafts to form the comminuting arrangement proper. The shafts 4 and 5 rotate at different speeds, each in a direction such that the peripheries of the rings 6, which rotate along with the shafts 4 and 5, move downwards between the two shafts and upwards outside the two shafts. The permanent ratio of their speeds of rotation is advantageously about 2:1, i.e., between 1.5:1 and 2.5:1.

On each of its flat faces, each ring 6 comprises a hub 16, half as thick as the edge of the ring, and a two-piece band 28 made of high-strength steel disposed along the peripheral margin of the ring. Cutters 7, also made of high-strength steel and situated along the rim of each ring 6, are held in place by the bands 28 in a manner which will be explained further on. The outside diameter of each ring 6 including the bands 28 is just slightly greater than the distance between the axes of the shafts 4 and 5, so that in a horizontal plane passing through those axes, the bands 28 are in immediate proximity to one another in the sense that the two bands 28 of one ring 6 borne by one shaft fit in between the bands 28 of two adjacent rings 6 borne by the other shaft. FIG. 2 plainly illustrates this design with alternately disposed rings. The two bands 28 of one ring 6 borne by one shaft always face the outer surfaces of the hubs 16 of two adjacent rings 6 borne by the other shaft, so that in the aforementioned horizontal plane, there is an interstice aligned with each ring 6. This interstice is defined by the rim of a ring 6 (and partially its bands 28), the marginal areas of the flat faces (partially covered by the bands 28) of the two adjacent rings 6 borne by the other shaft, and the peripheral surfaces of the hubs 16 of these same two rings 6.

The cutters 7, the particular form of which will be described further on, are thinner than the rings 6, and hence thinner than the width of an interstice as described above, and they extend beyond the edge of the ring 6 (or its bands 28) for a distance which is slightly less than the depth of such an interstice. Each ring 6 bears two cutters 7 disposed directly opposite one another, one offset to the left of the ring and the other to the right. Because the shafts 4 and 5 are hexagonal in cross-section, similar rings 6 may be mounted in different positions on a shaft. The adjacent rings 6 on the same shaft are shifted, preferably by 120° (the longitudinal "period" of three rings) or by 60°, with respect to one another. As the rings 6 rotate at different speeds, the relative position of two adjacent cutters 7 on two different shafts is essentially variable during operation. In FIG. 1, a condition is shown where there is a shift of 90° +n × 60° (n being an integer) between the shafts 4 and 5.

The particularities of the comminuting apparatus in question may be most conveniently explained in connection with FIGS. 3 and 4. FIG. 3 shows the right-hand part of FIG. 2 on a larger scale, while FIG. 4 is a section taken on the line IV—IV of FIG. 3. By means of a sectional view through the shaft 5 only, FIG. 3 shows how the shafts 4 and 5 are bearing-mounted in the frame 1. The shaft 5 (and the same applies to the shaft 4) ends in a cylindrical protion 10 mounted inside a sleeve 11, which is in turn mounted in the frame 1 via a ball bearing lodged in a sleeve 12. The other end of the shaft (not shown in FIG. 3) likewise comprises a cylindrical portion, larger in diameter than the portion 10, which is directly mounted in the frame 1 by means of another ball bearing. As will be seen later on, the sleeve 11 is capable of making a slight axial movement with respect to the portion 10, so that one of the two ball bearings must be able to effect a slight axial movement within the part of the frame 1 in which it is lodged. It is immaterial whether the ball bearing having a certain freedom of axial movement is the one mounted on the sleeve 11 (shown in FIG. 3) or the one situated at the other end (not shown); it will be assumed here that the ball bearing mounted on the sleeve 11 is the axially movable one and that the other one is axially fixed. In order to allow for this axial movement, the sleeve 12 is mounted in the frame 1 without being gripped tightly, but also without play. The ball bearing is held in the sleeve 12 in a conventional manner. Outside the sleeve 11, the cylindrical portion 10 supports two sliding collars 13 and 14 which grip two cupped resilient washers 15 and 17 between them. A nut 18 and a check-nut 19 are screwed on a threaded portion 20 at the end of the cylindrical portion 10, retaining the collar 14 axially so as to flatten the marginal areas of the resilient washers 15 and 17, which form a cavity between them, against one another. At the inner end of the cylindrical portion 10, a spacer-sleeve 21 is gripped between the ball bearing mounted on the sleeve 11 and the lateral face of the hub 16 of the last ring 6 engaged on the shaft 5. At the other end of the shaft (FIG. 2), the last hub 16 of the last ring 6 is pressed against the shoulder formed by the larger-diameter cylindrical portion bearing-mounted in the framme 1. It should be understood that the cylindrical portion 10 is inscribed in he six-sided profile by means of which the shaft 5 bears the rings 6, whereas the larger-diameter cylindrical portion mounted at the other end of the frame 1 is circumscribed about that six-sided profile.

It will be understood that when one or more rings 6 are urged axially towards the right, as viewed in FIG. 3, they are able to slide, pushing along the spacer-sleeve 21, the sleeve 11 (via the ball bearing mounted on it), and the collar 13, while causing the cupped resilient washers 15 and 17 to bend resiliently. As soon as the force thus urging the rings 6 ceases to be exerted, the resiliency of the washers 15 and 17 pushes the rings 6 back towards the left, so that they are once more squeezed against one another. When the ball bearing is supposed temporarily to move slightly towards the right, the sleeve 12 moves alongwith it within the cylindrical housing of the frame 1 in which it is situated. The arrangement of the shaft 4 and the rings 6 borne by it is identical to that of the shaft 5 except that the first and last rings 6 borne by the shaft 4 are, in fact, half-rings 22, each comprising only one hub 16 and one band 28 and no cutters 7. Thus the rings 6 mounted on the shafts 4 and 5 can move axially against a return force exerted by the washers 15 and 17 so that if, during operation, a particularly stubborn piece of scrap tends to become jammed between a cutter 7 and the band 28 of a ring 6, the shift towards the right of all the rings 6 borne by one or the other of the shafts 4 or 5 to the right of the location of that piece of scrap allows the latter to pass through without blocking the running of the apparatus. Thus the axial positioning of the rings is accomplished without any play in the strict sense, i.e., without non-resilient play, but with a degree of reslient play provided by the arrangement shown in FIG. 3.

In FIG. 2, which illustrates the utility of the resilient axial mounting, it is assumed that on each shaft 4 and 5, the rings 6 situated to the right of the first three rings 6 from the left have been shifted; thus the cutter 7 of the fourth ring from the left borne by the shaft 5, which cutter would normally be pressing against the face of the right-hand band 28 of the third ring from the left borne by the shaft 4, is actually a certain distance away from that face in order to permit the passage, if need be, of a particularly hard particularly hard particle in the material to be comminuted. This escape gap is indicated in FIG. 2 by arrows 33. It will be obvious that when the escape gap between the rings 6 is somewhere in the middle of the apparatus, all the rings 6 situated on both shafts 4 and 5 to the right of that gap will shift against the return force of the resilient washers 15 and 17. Therefore, in the apparatus described, it is possible to have such a gap at any point along the length of the comminuting apparatus; it is even possible to have two gaps at the same time, sharing the total amount of resilient play allowed by the washers 15 and 17.

It may be seen in FIG. 3 that the outer surfaces 23 of the hubs 16 of the comminutor rings 6 are not cylindrical but conical, which means that the reaction surfaces opposing the material pressed by backs 24 of the cutters 7 tends to cause that material to escape axially, and this prevents clogging between the back 24 of the cutter 7 and the hub 16 facing it. What is more, the backs 24 of the cutters 7 are likewise inclined (or partially inclined, at least in those portions which extend beyond half the width of the rings); this, too, promotes the axial pressure action exerted upon the material being comminuted.

The shape of the cutters 7 may be seen in FIG. 4. These high-strength steel cutters 7 have a nose 25 which comprises a sharp edge between the partially inclined surface of the back of the cutter 7 and a cutting edge 26 which forms an acute angle with the surface 24. The cutters 7 illustrated are made entirely of high-strength hardened steel. As a variation, the noses and edges of the cutters might consist of attached plates of hard metal (preferably brazed on) at the appropriate locations of the cutter, the body of which would still be made of high-strength steel. The way in which the cutters 7 work will be easily understood from FIGS. 3 and 4; it should be noted that the lateral surface of each cutter 7 which lies in the projection of a side face of the flat ring 6 bearing that cutter comes into the immediate proximity of the side face of an adjacent flat ring 6 borne by the other shaft, so that the edge of it produces a shearing effect against the sharp edge of the band 28 of that adjacent ring 6. As the cutter 7 does not take up the whole width of the interstice into which it passes, the material to be comminuted, e.g., the rubber of a tire, can creep so as to come alongside the cutter 7 into an additional clearance space, and there the material can stretch until it breaks. Because the shafts 4 and 5 and their respective rings 6 rotate at different speeds, the passing of a cutter 7 into an interstice may correspond to any position of the cutters 7 borne by the rings 6 delimiting that interstice. Whenever two cutters 7 happen to arrive in two adjacent interstices at the same time, they will first act jointly like scissor-blades before producing a shearing effect.

FIG. 3 shows how two bands 28, each composed of two semi-circular elements made of high-strength steel, are secured by countersunk screws 29 to the peripheral margins of each flat ring 6 to form the rim-edges of the rings 6. The bands 28 are made in two pieces rather than one so that they can be attached and detached without its being necessary to dismantle the ring 6.

The bands 28 also serve to secure the cutters 7 to the rings 6. Considering FIS. 3 and 4 together, it will be seen that the rings 6 have mortises of a modified dovetail shape, in each of which a matching base tenon 30 of a cutter 7 is engaged. The rounded extensions of the tenon 30 are embraced and held by the material of the ring 6 itself. The cutters 7 are fitted in axially when the bands 28 are removed, and once they are in place, the bands 28 are screwed on so that the cutters 7 are firmly held laterally with respect to the ring 6.

Thus the bands 28 have a dual function, viz., to hold the cutters 7 in place and to provide a reaction surface, and above all an edge, of high mechanical strength for the comminuting action of the cutters 7. The cutters 7 might also be anchored in the ring 6 by means of three triangular lateral projections engaging in matching recesses. Other anchoring designs might likewise yield good results.

Instead of two diametrically opposed cutters 7, there might equally well be four or even six, these being alternating "right-hand" and "left-hand" cutters, i.e., ones which are mirror images of each other.

It will also be seen from FIGS. 2 and 3 that the long sides of the frame 1 bear comb-like projections 34 at the level of the shafts 4 and 5. The purpose of the projections 34 is to keep the more or less sticky comminuted material from adhering to the rings 6 and coming back up again at the sides. As is shown in FIG. 3, the projections 34 constituting the "teeth" of these combs are bolted onto the long sides of the frame 1 from the outside. FIG. 3 also shows how protective cover plates 35 are provided all around the inside of the frame 1. The transverse plate 35 portions have openings through which the spacer-sleeves 21 just pass, i.e., without function but with only a minimum of clearance, so that scrap is prevented from reaching the bearing locations. A similar arrangement is provided at the other end (not shown in FIG. 3) of the frame 1.

It should be noted that the shafts 4 and 5 are rotated independently of one another by hydraulic motors 200 and 202 with associated pumps 204 and 206 as shown in FIG. 8. As compared with electric motors, hydraulic motors have the advantage of not increasing their torque too greatly when they are blocked. This obviates the necessity of making the entire apparatus strong enough to withstand such mechanical torques, several times greater than those encountered during normal operation, as occur when pieces of scrap which are too hard block the apparatus. The hydraulic motors are powered at approximately the same pressure but with different flow capacities, so that one of the shafts idles at about 40 rpm while the other idles at about 80 rpm. With a load, these speeds of rotation are reduced at most to 20 rpm for the slower shaft and 40 rpm for the faster one.

Provision is also mode for means to detect the rise in oil pressure (on the order of 20–3o%) which takes place when one of the shafts is blocked after a certain time lag, this means 208 (see FIG. 8) causes the hydralic motors to run in the opposite direction for a certain period of time measured by a time-lag element. Thus if one or both shafts are stopped by pieces of scrap which are too hard and too large and which cannot escape despite the possible axial play of the rings 6, both shafts first top briefly and then start to rotate in the reverse direction, releasing the material which is incapable of passing through. After a brief interval of such reverse operation, it is possible either to stop the apparatus and set off an alarm alerting the operator to come and find out what is happening, or to start the apparatus running forward again, assuming that since the shafts rotate at speed which are not perfectly synchronized, a new relative positioning of the cutters 7 will then allow better seizing and comminuting of the blocked pieces of scrap.

For certain materials which lend themselves to such processing, it is also possible to provide cutters occupying the entire width of the interstices between two adjacent rings and cutting simultaneously to the left and to the right, thus producing more finely cut-up scrap. In that case, three cutters per ring could be provided, i.e., either all three cutting left and right simultaneously, or one cutting in that manner, one cutting only to the left, and one cutting only to the right. If there are three cutters, they will naturally be shifted by 120°. In any event, the cutters can be changed without any necessity of dismantling the whole apparatus, simply by removing the semicircular elements of the bands 28, so that any one apparatus can be adapted to different operating conditions, each apparatus preferably being with several sets of cutters of different shapes.

It should also be noted that in order to achieve the resilient compression of the flat comminutor rings, with the possibility of resilient play, recourse is had only to a mechanical reaction produced by the shaft bearing the rings itself, without having the frame subjected to any stress. This is an important consideration, for in view of its design, the frame would not be likely to hold up well under the constant task of transmitting a mechanical reaction from one end of a shaft to the other.

In another embodiment, developed with a view to providing an even sturdier comminuting machine, especially as regards the strength of the mechanical connection between the cutters (or the cutter noses) and the shaft which actuates them, the flat rings mounted on the shafts ad equipped with gripping means, preferably consisting of attached cutters, are replaced by composite flat rings having the same function. Each element of this composite rings is anchored directly in grooved portions of the shaft bearing the ring and comprises a seizing and/or tearing facility, e.g., nose, cutter, pick, hook, etc., as an integral part of its body. Thus the enormous amounts of force acting upon the gripping means are transferred directly and very rigidly to the rotating shafts.

FIGS. 5 and 6 show that in this second embodiment, shafts 101 have grooved bearing surfaces 102 alternating with smooth bearing surfaces 102a. Flat fings 114, each composed of several elements 103 forming cutter-noses, are snug-fitted on the grooved surfaces 102. The width (thickness) of a ring 114 is substantially equal to half the sum of the widths of a grooved bearing surface 102 and a smooth bearing surface 102a between two grooved bearing surfaces, the width of a grooved bearing surface (i.e., the length of the grooves) being slightly less than the width of a ring, while the width of a smooth bearing surface is slightly greater than the width of a ring. Thus the elements 103 may easily be removed by siding them parallel to the axis of the shafts 101.

The rings 114 are composed of two, three, four, five, or six elements 103 interconnected by high-strength screws 104, as may be seen in FIG. 5. By unscrewing two consecutive screws 104, it is possible to remove one of the elements 103 of the ring 114 by moving it axialy , without having to dismantle or shift the other elements.

Two examples of rings are illustrated in FIG. 5, one having five noses and one having three noses. Using this same form of design, it is possible to have multiple-nose rings having from two to six or more elements 103. The number of grooves should be a common multiple of the different numbers of elements 103 of which it is anticipated that the ring may be composed. Advantageously, there will be thirty grooves, thus allowing for two, three, five, or six elements 103. This design therefore enables the number of noses to be varied, thus varying the cutting length and the coarseness of the scrap resulting from the comminution.

FIGS. 7a and 7b a ring element 103 on a larger scale; it comprises a nose 115 which acts like a chisel, the reaction being provided by the opposite shaft which functions as an anvil.

Both the smooth bearing surfaces 102a of the shafts 101 and the grooved bearing surfaces 102 are heat-treated to give them the greatest possible resistance to wear. The faces 109 of the noses 115 and the edges 105 are also heat-treated, and highchrome steels are used, varying between 6% and 13% chromium content depending upon the application.

The backs of the noses 115 may be milled along the circular profile or one composed of a succession of flats, or a combination of both.

A clearance 106 of a few tenths of a millimeter (FIG. 7a) exists between each two adjacent ring elements 103, thus making it possible to tighten and adjust the rings 114. There is also a play 108 of a few tenths of a millimeter (FIG. 6) between each two adjacent and opposing rings 114. If it is necessary to take up this play owing to wear, after rectification or during use, it is possible to do so by sliding the ring 114 parallel to the axes of the shafts 10. It is likewise conceivable to have a completely resilient system held in place by spring-washers, as in the first embodiment described, supported on a thrust-bearing.

Relief angles $\delta$ and $Y$ (FIG. 5) are made on the noses 115. These angles vary between 10° and 20°. A relief angle $\epsilon$ is created at the nose-face 109 in the variaton of the shape of the nose 115 shown in FIG. 7a. The angle $\epsilon$ may be from 0° to 101°. Other design variations are possible. For example, the relief angle $\epsilon$ may be accentuated starting from the center of the cutting face 109; it then becomes angle of rake or release which may cover between 15° and 140°. Still another relief angle of 10°–30° may be provided in a plane perpendicular to the plane of the composite ring 114 and passing through the center of the ring. The noses 115 and their working surfaces may be produced by combining one or more of the relief angles mentioned above.

Each screw 104 is placed in a recess 110 which retains the head of the screw 104. A shank 111 slides snug-fittingly into a bore in the element 103 having the nose 115. The end of each screw 104 is screwed into the element 103 in a threaded bore 112. As is shown in a dot-dash line $v$ in FIGS. 5 and 7b, the cutter element 103 may itself be composed, as a variation, of two parts, viz., a front cutting part and a rear pressing part, each front cutter part being gripped, with a slightly oblique bearing component, between the rear part of the same element and the rear part of the next element. Tightening by means of the screw 104 then tends to cause the front part of the element 103 to be slightly displaced in radial direction, thus taking up the slight play of the screw 104 in the bore of the element 103 since the very slight shift in the radial direction (of the ring 114) eliminates the possibility of an axial movement between two adjacent parts of elements 103 which are screwed together.

With this variation, only the front portions of the elements 103 need be changed when wear on the cutting edges or a modification in coarseness require that the shape of the nose 115 be changed.

According to the concept described above, it is likewise possible to provide various models of the comminuting apparatus which are adapted, especially through the size and shape of the cutters, the speeds of rotation, etc., to certain specific kinds of comminution.

The drive arrangement may also be of other suitable kind. In particular, it might comprise a clutch and/or torqueconrol device for facilitating the starting up and the use of the comminuting apparatus.

Although the present invention has been explained with reference to particular examples of embodiments, it should be understood that numerous variations and other embodiments may be envisaged without departing from the overall concept of the invention.

What is claimed is:

1. An apparatus for comminuting bulky objects, especially vehicle tires, other tough and rubbery materials, and parts of automobile bodies, comprising:
   two parallel shafts having a predetermined distance between them,
   means for rotating said shafts in opposite directions, and
   comminuting rings having peripheries of predertermined dimensions, said rings being borne and rotated by said shafts and being alternately axially staggered with respect to one another on each of said shafts,
   said predetermined distance and said predetermined dimensions being such that said peripheries of said rings borne by one of said shafts, when viewed in axial projection, overlap said peripheries of said rings borne by the other of said shafts, a plurality of interstices being formed between portions of said rings and of said shafts, said rings being provided with means including sharp, pointed portions for seizing and comminuting said objects while conveying them through said interstices,
   wherein said shafts comprise a number of alternately disposed grooved bearing surfaces and smooth bearing surfaces,
   said rings comprise a number of elements, each in the shape of a sector of an annulus and having a grooved, concave, cylindrical inner surface engaged with a portion of said grooved bearing surface,
   the said elements of each said ring bearing interconnected by high-strength tangential connecting means, and
   each said element having on the outside a said sharp, pointed portion forming a cutter-nose for seizing and comminuting said objects,
   the shape of said cutter-noses being adapted to said objects adn to a desired coarseness of comminuted material.

2. An apparatus in accordance with claim 1, wherein said tangential connecting means comprise high-strength screws, each having a head countersunk in one said element and a shak which passes through said one element and is screwed into an adjacent said element.

3. An apparatus in accordance with claim 1, wherein the width of each of said ring is substantialy equal to half the sum of the widths of a said grooved bearing surface and a said smooth bearing surface, the width of each said grooved bearing surface being slightly less than the width of a said ring, the width of each said smooth bearing surface being slightly greater than the width of a said ring, and the ratios of said widths being such as to facilitate removal of said elements by sliding them parallel to the axis of said shaft.

4. An apparatus in accordance with claim 2, wherein a clearance of a fraction of a millimeter is left between each two adjacent said elements for allowing tightening and adjusting of said rings.

5. An apparatus in accordance with claim 4, wherein each said element comprises a front cutting part and a rear pressing part, the compression of a said front part between said rear part of the same said element and said rear part of a preceding said element developing a radial force component capable of taking up the play of said screw in the said element through which it passes for preventing said play from causing an undesired axial shift between two adjacent said element parts screwed together.

6. An apparatus in accordance with claim 1, wherein said cutter-noses comprise frontal edges which become operative in immediate proximity to said smooth bearing surfaces of said shaft facing them, each said edge functioning like a chisel on cooperaton with said smooth bearing surface functioning like an anvil, said edges allowing said objects to be cut to a predetermined length which is substantially equal to the distance between the respective said edges of two successive said cutter-noses.

7. An apparatus in accordance with claim 1, further comprising means allowing any number of said rings to move axially against a resilient return force for permitting the escape from said apparatus of overly resistant parts of said objects.

8. An apparatus in accordance with claim 7, further comprising resilient axial holding means, wherein said rings are mounted on said shafts so as to be integral in rotation therewith but axially displaceable thereon, axial compression of said rings being produced by axial abutment against said resilient axial holding means and by reaction of said shafts, a separation thereby being made possible at any location between two groups of said rings, one said group, comprising all said rings situated on one side of said separation location, being displaced with respect to the other said group comprising all said rings situated on the other side of said separation location.

9. An apparatus in accordance with claim 8, wherein said resilient axial holding means comprise at least one resilient washer.

10. An apparatus in accordance with claim 1, wherein said shafts are rotated at speeds having a fixed ratio between about 1.5:1 and about 2.5:10.

11. An apparatus in accordance with claim 1, wherein said means for rotating said shafts comprise a hydraulic motor for each said shaft.

12. An apparatus in accordance with claim 11, wherein said hydraulic motors supply torques substantialy similar to different speeds, the relation function between said speed and said torque of each said motor being dependent upon an oil pressure applied to said motor, and detector means being provided in cooperation with each said hydraulic motor for detecting a blocking of at least one said shaft and for temporarily causing said shafts to be driven in reverse if said blocking persists for predetermined length of time.

13. An apparatus for comminuting bulky objects, especially vehicle tires, other tough and rubbery materials, and parts of automobile bodies, comprising:
two parallel shafts having a predetermined distance between them,
means for rotating said shafts in opposite directions, and
comminuting rings having peripheries of predetermined dimensions, said rings being borne an rotated by said shafts and being alternately axially staggered with respect to one another on each of said shafts,
said predetermined distance and said predetermined dimensions being such that said peripheries of said rings borne by one of said shafts, when viewed in axial projection, overlap said peripheries of said rings borne by the other of said shafts, a plurality of interstices being formed between portions of said rings and of said shafts, said rings being provided with means including sharp, pointed portions for seizing and comminuting said objects while conveying them through said interstices,
further comprising means allowing any number of said rings to move axially against a resilient return force for permitting the escape from said apparatus of overly resistant parts of said objects.

14. An apparatus in accordance with claim 13, wherein said means allowing axial movement of the rings comprises resilient axial holding means comprising at least one resilient washer, wherein said rings are mounted on said shafts so as to be integral in rotation therewith but axially displaceable thereon, axial compression of said rings being produced by axial abutment against said resilient axial holding means and by reaction of said shafts, a separation thereby being made possible at any location between rings situated on one side of said separation location, being displaced with respect to the other said group comprising all said rings situated on the other side of said separation location.

15. An apparatus for comminuting bulky objects, especially vehicle tires, other tough and rubbery materials, and parts of automobile bodies, comprising:
two parallel shafts having a predetermined distance between them,
means for rotating said shafts in opposite directions, and
comminuting rings having peripheries of predetermined dimensions, said rings being borne and rotated by said shafts and being alternately axially staggered with respect to one another on each of said shafts,
said predetermined distance and said predetermined dimensions being such that said peripheries of said rings borne by one of said shaft, when viewed in axial projection, overlap said peripheries of said rings borne by the other of said shafts, a plurality of interstices being formed between portions of said rings and of said shafts, said rings being provided with means /including sharp, pointed portions for seizing and comminuting said objects while conveying them through said interstices,
wherein said means for rotating said shafts comprise two hydraulic motors, each driving a respective said shaft and supplying torques for rotating said shafts at different speeds, the relation function between said speed and said torque of each said motor being dependent upon an oil pressure applied to said motor, and detector means being provided in cooperation with each said hydraulic motor for detecting a blocking of at least one said shaft and for temporarily causing said shafts to be driven in reverse if said blocking persists for a predetermined length of time.

* * * * *

UNITED STATES PATENT AND TRADEMARK OFFICE
CERTIFICATE OF CORRECTION

PATENT NO. : 3,991,944
DATED : November 16, 1976
INVENTOR(S) : Eugene M. A. Baikoff It is certified that error appears in the above-identified patent and that said Letters Patent are hereby corrected as shown below:

Col. 2, line 7, "operaion" should read --operation--.

Col. 3, line 24, "representatin" should read --representation--.

Col. 3, line 30, "feet b" should read --feet 8--.

Col. 5, line 16, "he" should read --the--.

Col. 7, lines 19 and 20, "function" should read --friction--.

Col. 7, line 41, "mode" should read --made--.

Col. 7, line 42, "3o" should read --30--.

Col. 7, lines 44 and 45, "hydralic" should read --hydraulic--.

Col. 7, line 50, "top" should read --stop--.

Col. 8, line 23, "ad" should read --and--.

Col. 8, line 26, "this" should read --these--.

Col. 8, line 53, "axialy" should read --axially--.

Col. 8, line 67, insert the word --show-- after "7b".

Col. 9, line 33, "140" should read --40--.

UNITED STATES PATENT AND TRADEMARK OFFICE
CERTIFICATE OF CORRECTION

PATENT NO. : 3,991,944
DATED : November 16, 1976
INVENTOR(S) : Eugene M. A. Baikoff It is certified that error appears in the above-identified patent and that said Letters Patent are hereby corrected as shown below:

Col. 10, line 1, "torqueconrol" should read --torquecontrol--.

Col. 10, lines 16 and 17, "predertermined" should read --predetermined--.

Col. 10, line 46, "adn" should read --and--.

Col. 11, line 13, "cooperaton" should read --cooperation--.

Col. 11, line 55, insert "a" before "predetermined".

Col. 11, line 64, "an" should read --and--.

Col. 12, line 26, insert --two groups of said rings, one said group comprising all said-- after "between".

Col. 12, line 45, "shaft" should read --shafts--.

Signed and Sealed this

Eighth Day of February 1977

[SEAL]

Attest:

RUTH C. MASON
Attesting Officer

C. MARSHALL DANN
Commissioner of Patents and Trademarks